United States Patent
Häkkinen et al.

(10) Patent No.: US 9,622,286 B2
(45) Date of Patent: Apr. 11, 2017

(54) REDUCED RADIO RESOURCE CONTROL CONNECTIVITY

(75) Inventors: Hannu Tapio Häkkinen, Espoo (FI); Hannu Pekka Matias Vaitovirta, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 283 days.

(21) Appl. No.: 13/822,865

(22) PCT Filed: Sep. 13, 2010

(86) PCT No.: PCT/EP2010/063384
§ 371 (c)(1),
(2), (4) Date: Apr. 19, 2013

(87) PCT Pub. No.: WO2012/034580
PCT Pub. Date: Mar. 22, 2012

(65) Prior Publication Data
US 2013/0208699 A1    Aug. 15, 2013

(51) Int. Cl.
| | | |
|---|---|---|
| H04W 36/22 | (2009.01) | |
| H04W 36/08 | (2009.01) | |
| H04W 52/02 | (2009.01) | |
| H04W 28/02 | (2009.01) | |
| H04W 76/04 | (2009.01) | |
| H04W 76/06 | (2009.01) | |

(52) U.S. Cl.
CPC ..... H04W 76/046 (2013.01); H04W 52/0209 (2013.01); H04W 76/068 (2013.01)

(58) Field of Classification Search
CPC ............... H04W 36/022; H04W 36/00; H04W 36/0005; H04W 36/0016; H04W 36/0027; H04W 36/0033; H04W 36/0055; H04W 8/08; H04W 24/10; H04W 52/0216; H04W 36/22; H04W 36/0083; H04W 28/0247; H04W 28/10; H04W 76/048; H04W 24/02; H04W 28/02; H04W 48/06
USPC ....... 370/329, 235, 252, 331, 232, 328, 229; 455/450, 445, 452.1, 509, 525
See application file for complete search history.

(56) References Cited

U.S. PATENT DOCUMENTS 6,427,114 B1 *  7/2002  Olsson ................... H04L 47/10
                                                                340/934
8,515,436 B2 *  8/2013  Song et al. ................... 455/450
(Continued)

FOREIGN PATENT DOCUMENTS

| EP | 1 981 224 A1 | 10/2008 | |
|---|---|---|---|
| KR | EP 1981224 A1 * | 10/2008 | .......... H04W 76/046 |
| WO | WO 2012/025158 A1 | 3/2012 | |

OTHER PUBLICATIONS

"Improved state transition to CELL_DCH", Motorola, 3GPP TSG-RAN, WG2 Meeting #57, R2-070695, Feb. 2007, 4 pgs.
(Continued)

Primary Examiner — Wutchung Chu
(74) Attorney, Agent, or Firm — Harrington & Smith

(57) ABSTRACT

Embodiments of the present invention relate to reduction of radio connectivity of a bearer service. Upon detection of low data transfer activity within a bearer service, radio connectivity of the bearer service is reduced so as to reduce signaling overhead in an air interface. However, a core network connection of the bearer service is maintained.

18 Claims, 3 Drawing Sheets

(56) References Cited

U.S. PATENT DOCUMENTS

| | | | |
|---|---|---|---|
| 2002/0172169 A1* | 11/2002 | Rosen | H04M 3/42 370/335 |
| 2002/0177461 A1* | 11/2002 | Rosen | H04M 3/42 455/518 |
| 2004/0052246 A1 | 3/2004 | Jang | 370/352 |
| 2005/0064872 A1* | 3/2005 | Osseiran | H04B 7/0408 455/452.1 |
| 2005/0163074 A1* | 7/2005 | Mella | H04W 36/16 370/329 |
| 2005/0163078 A1* | 7/2005 | Oba et al. | 370/331 |
| 2005/0169205 A1* | 8/2005 | Grilli | H03M 13/2703 370/313 |
| 2006/0106865 A1* | 5/2006 | Beming | H04W 36/12 |
| 2006/0146760 A1* | 7/2006 | Khandekar | H04B 1/713 370/335 |
| 2006/0222009 A1* | 10/2006 | Yao | H04W 92/06 370/469 |
| 2007/0201436 A1* | 8/2007 | Kim et al. | 370/352 |
| 2009/0124249 A1* | 5/2009 | Young et al. | 455/422.1 |
| 2009/0318199 A1* | 12/2009 | Barreto et al. | 455/574 |
| 2010/0062777 A1* | 3/2010 | Nadas | H04L 47/10 455/445 |
| 2010/0202382 A1* | 8/2010 | Park et al. | 370/329 |
| 2010/0329210 A1* | 12/2010 | Shirota et al. | 370/331 |
| 2011/0038348 A1* | 2/2011 | Borsella et al. | 370/331 |
| 2011/0130141 A1* | 6/2011 | Frost et al. | 455/436 |
| 2011/0243003 A1* | 10/2011 | Oguchi | 370/252 |
| 2011/0317659 A1* | 12/2011 | Ramachandran et al. | 370/331 |
| 2012/0099455 A1* | 4/2012 | Morita | H04W 16/10 370/252 |
| 2012/0236751 A1* | 9/2012 | Lee et al. | 370/252 |
| 2013/0316720 A1* | 11/2013 | Dwyer et al. | 455/450 |

OTHER PUBLICATIONS

"Discussion on EPS bearer deactivation", Alcatel-Lucent, 3GPP TSG RAN WG2 Meeting #66, R2-093083, May 2009, 3 pgs.

"Preservation Procedure for active to Idle Transition in E-UTRAN Access", 3GPP TSG SA WG2 Architecture-S2#58, S2-072526, Jun. 2007, 3 pgs.

* cited by examiner

REDUCED RADIO RESOURCE CONTROL CONNECTIVITY

FIELD

The invention relates to the field of cellular radio telecommunications and, particularly, to controlling radio resource connectivity.

BACKGROUND

In current long-term evolution (LTE) versions of cellular telecommunication systems developed within 3GPP (3$^{rd}$ Generation Partnership Project), two radio resource control connection states are provided: an idle state and an ARC connected state. These two states are associated with Enhanced Packet Service Connection Management Idle (ECM-IDLE) and ECM-CONNECTED states on connection management level between user equipment (UE) and Enhanced Packet Core, i.e. a core network. In current LTE implementation, an S1 interface between a radio access network (eUTRAN) and the core network (EPC) is connected to a serving base station (enhanced Node B) only in the RRC connected state with the UE. In a handover, the S1 path is switched from a source eNB to a target eNB. Many UEs run applications that produce "keep alive" type of messages for maintaining presence information, server registration, and/or access through a firewall, for example. These applications may be designed for general purposes, e.g. a personal computer (PC) connected to the Internet via LAN, ADSL, WLAN etc. The configuration of this type of keep alive messaging, particularly a messaging interval, may not be optimized for mobile technologies. Transporting such a small amount of data per user causes high rate of radio network control signaling, when a high number of terminals run such applications over long periods. Several simultaneous applications per user may increase rate of messaging without justifying the maintenance of a continuous RAC connection.

BRIEF DESCRIPTION

According to an aspect of the present invention, there are provided methods as specified in claims 1 and 7. According to another aspect of the present invention, there are provided apparatuses as specified in claims 11 and 17.

According to yet another aspect of the present invention, there are provided computer program products embodied on computer readable distribution media as specified in claims 6 and 10.

Embodiments of the invention are defined in the dependent claims.

LIST OF DRAWINGS

Embodiments of the present invention are described below, by way of example only, with reference to the accompanying drawings, in which FIG. 1 illustrates a general structure of a modern cellular telecommunication system having a flat radio access network architecture;

DESCRIPTION OF EMBODIMENTS

Figure 1:
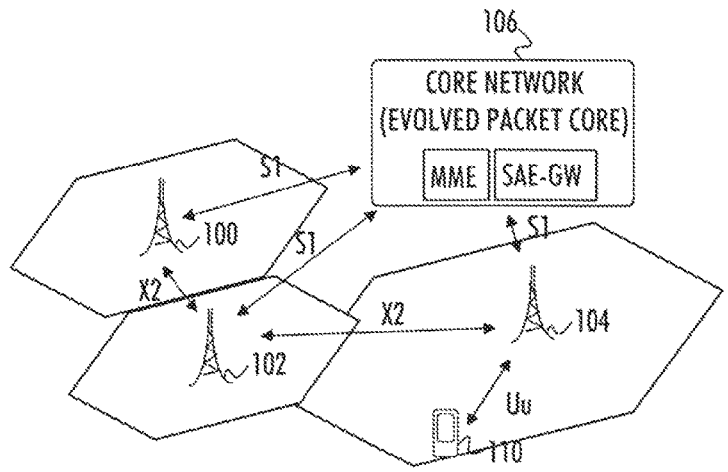

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features/structures that have not been specifically mentioned. A general architecture of a cellular telecommunication system providing voice and data transfer services to mobile terminals is illustrated in FIG. 1. The cellular telecommunication system of FIG. 1 has elements of a UMTS LTE (Universal Mobile Telecommunication System Longterm Evolution) system standardized within 3GPP (3$^{rd}$ Generation Partnership Project), but it should be noted that embodiments of the present invention may be applied to other cellular telecommunication systems as well. Referring to FIG. 1, the cellular telecommunication system comprises a radio access network comprising a plurality of base stations (enhanced Node B in the UMTS LTE) 100, 102, 104. The UMTS LTE system has a flat radio access network structure which means that the radio access network comprises only base stations without a centralized controller as a radio network controller (RNC) in a legacy UMTS W-CDMA (wideband code division multiple access) system. The base stations 100 to 104 are configured to carry out radio resource control functionalities independently, but they may communicate with other base stations over an X2 interface and with a core network 106 over an S1 interface so as to implement a self-organizing network and flexible spectrum utilization. The core network (an evolved packet core in the UMTS LTE) comprises a mobility management entity (MME) handling signaling between terminal devices and the core network, and in controls bearers on a session level in a non-access stratum (NAS) protocol. The core network comprises also gateway nodes (SAE-SW) handling data routing. An interface between a base station 104 and a terminal device 110 is called Uu interface in the UMTS LTE.

Figure 2:
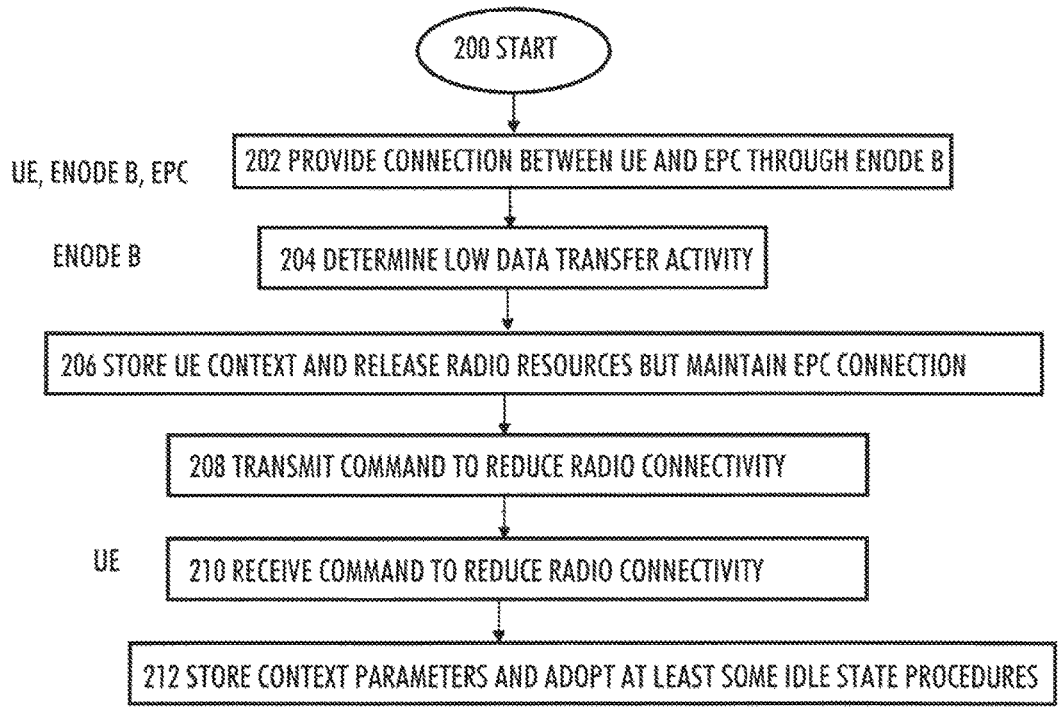
FIG. 2 illustrates a flow diagram of a process for reducing radio connectivity of a bearer service according to an embodiment of the invention.

FIG. 2 illustrates a flow diagram of a process for reducing radio resource control connectivity according to an embodiment of the invention. Some of the steps of the process are carried out in the base station (eNode B), some steps are carried out in the core network (EPC), and some steps are carried out in the terminal device (UE, user equipment). The process starts in step 200. In step 202, a connection (a bearer service) is provided between the EPS and the UE through an eNode B currently serving the UE. The MME of the EPS may establish an S1-AP signaling connection and other connections needed to control the bearer service in the EPC and in the radio access network, the serving eNode B may establish a radio resource control (RRC) connection with the LIE and carry out RRC functionalities so as to schedule radio resources to the bearer service, and the UE may carry out RRC setup procedures with the serving eNode h, as known in the art. In general, step 202 may include conventional bearer setup procedures carried out by the EPC, serving eNode B, and UE.

In an embodiment, the eNode B provides the UE with a paging discontinuous reception (DRX) parameter that allows the UE to synchronize to a paging period of the eNode B in an idle state and under reduced radio connectivity.

In step 204, the serving eNode B determines that data transfer activity of the connection is low or non-existent, This may result from bursty traffic, common to messaging applications, e-mail, etc., or it may result from frequent transmission of small amounts of information, e.g. signaling messages, or it may be otherwise determined that a full or continuous RRC connection is not efficient on a system level. In response to the determination of the low data transfer activity, the eNode B stores in step 206 context parameters of the radio connection and releases radio resources of the radio connection while maintaining the core network connection. In other words, the EPC still assumes that the bearer service is operational, while eNode B has reduced the radio connectivity and suspended RRC procedures, i.e. connection over the S1 interface is maintained for the bearer service.

In step 208, the eNode B transmits a command to reduce the radio connectivity to the UE, and the UE receives the command from the eNode B in step 210. The command may be an RRC connection release message with an additional field that instructs the UE to release the radio connection but store its context parameters for fast restoration. In response so the received command, the UE, stores in step 212 context parameters of the radio connection and adopts at least some idle state procedures. Similarly, the eNode B adopts at least some the idle state procedures for the UE, e.g. handovers of the UE are omitted. In steps 206 to 212, the eNode B and the UE initiate a procedure for delayed release of the whole bearer service, and the final release of the bearer service may occur upon the expiry of a timer, once a determined number of cell selections have been carried out by the terminal device and/or once a determined event in mobility of the terminal device has been observed the number of cell, selections or a determined relocation of the terminal device). The timer and tracking the number of the cell selections may be started in response to the initiation of the procedure for delayed release of the whole bearer service.

The UE may carry out the counting of the number of cell selections during the procedure for the delayed release of the bearer service.

In the embodiment of FIG. 2, the RRC connectivity of the bearer service, is reduced while the core network connection of the bearer service is maintained. In other words, the EPS assumes an ECM (Enhanced Packet Service Connection Management) Connected state. The non-access stratum layer of the UE may also assume the ECM Connected state, i.e. the connectivity is reduced only in the lower protocol layers. The context parameters of the RRC connection are also stored in the both the UE and eNode B for quick recovery upon reestablishment of the RRC connection. Thus, the connection is actually maintained but the signaling in the radio (Uu) interface is reduced, as the radio connection is practically released and as the UE adopts at least some idle state procedures. The reduction of the Uu interface signaling also reduces power consumption of the UE. The idle state procedures the UE adopts may include idle state cell (re)selection caused by the mobility of the UE. The cell selection includes selection of a cell (of a given eNode B) where the UE chooses to camp and receive a broadcast control channel. The cell may be selected on the basis of radio measurements carried out by the UE. The cell selection may also include a location registration update so that the network knows the area where the UE is located. The stored RRC context parameters may include radio link control (RLC), medium access control (MAC), and packet data convergence protocol (PDCP) parameters, e.g. quality-of-service (QoS) parameters, identifiers of the UE and the connection (both radio bearer service and the S1 interface bearer service), bearer service parameters, measurement setup parameters, security parameters including various encryption keys, and any valid counters.

Figure 3:
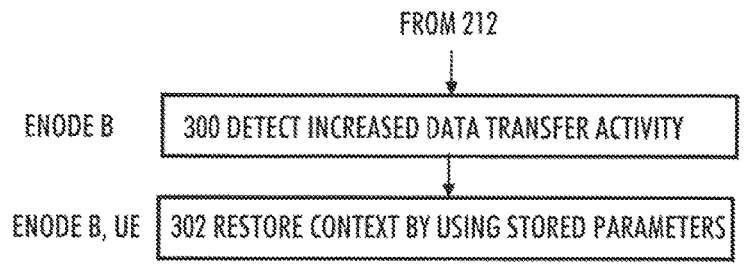
FIGS. 3 and 4 are extensions to the flow diagram of FIG. 2, illustrating radio connectivity restoration and release of the bearer service according to embodiments of the invention.

As mentioned above, the context parameters of the radio connection are stored in both the UE and eNode B for quick recovery when the reestablishment of the radio connection is triggered. A triggering event may be the detection of downlink data traffic in the bearer service from the EPC, a connection reestablishment request made by the UE or, in general, detection of increased traffic activity in the bearer service. FIG. 3 illustrates an extension to the process of FIG. 2. Referring to FIG. 3, step 300 is carried out after step 212 of FIG. 2. In step 300, the eNode B detects said increased data transfer activity in the bearer service established in step 202. The detection of increased data transfer activity triggers the reestablishment of the RRC connection, and both the eNode B and the UE restore the RRC connection by using the context parameters stored in steps 206 and 212. As the RRC connection reestablishment uses the stored context parameters, the reestablishment is fast and signaling in the Uu interface is reduced.

In an embodiment, the reduced radio connectivity is implemented by a gradual release of the RRC context. This transition mechanism may be called. Delayed. RRC Connection. Release, for example. In a first phase, the RRC context parameters are stored and the radio connection is released (steps 206, 212) and, in a second phase, the context parameters are discarded and the core network connection in the S1 interface is released.

The command to reduce the radio connectivity transmitted in step 208 and received in step 210 may be a conventional RRC Connection Release message with additional fields as presented in Table 1.

TABLE 1

| RRC Connection Release | | |
|---|---|---|
| Information Element | Number of bits | Semantic description |
| Conventional fields . . . | | |
| Timer | X1 bits | Delayed connection release timer |
| Cell selection threshold | X2 bits | Number of cell reselections for context relocation request |
| Cell selection validity | 1 or 2 bits | Cell selection to other frequencies and/or CSGs allowed |

The timer defines a time period for the reduced RRC connectivity before the bearer service is released. In other words, the fast restoration of the full RRC connectivity is possible until the timer expires. The time duration counted by the timer may be defined by an index selected by the serving eNode B, and the number of available durations defines the number of bits needed to index the duration to be used. The duration of the timer may be a few seconds, and different options may include, for example, the following durations: 10 s, 30 s, 1 min, 2 min and 5 min If the system supports only a single timer, the duration of the timer is explicit to the UE without a separate field in the RRC Connection Release message.

A cell selection threshold defines the number of cell selections the UE may make in the reduced connectivity before the context relocation is triggered. In an embodiment, the cell selection threshold is two or higher. The cell selection threshold may be determined by the serving eNode B on the basis of a paging strategy and/or the mobility of the UE. A high cell selection threshold prevents unnecessary context relocations and may reduce signaling in an X2 interface(s). On the other hand, a low cell selection threshold prevents the retrieval of the context over numerous X2 legs. In case of high mobility, multiple context relocations may be carried out in the reduced connectivity state. The context relocation comprises transfer of the context parameters from the eNode B that stored the context parameters in step 206 to an eNode B in whose cell the UE currently camps. The transfer of the context parameters may be carried, out over the X2 interface(s). The core network connection may still be maintained with the eNode B that initiated the reduced connectivity state.

A cell selection validity parameter defines whether inter-frequency cell selections and/or cell selections to other closed subscriber groups (CSG) are allowed. The value of the parameter may depend on the X2 interface connectivity of the serving eNode B, i.e. cell selections are only allowed to those eNode Bs that have X2 connectivity to the eNode B that stored the RRC context. One or two bits may be needed for this parameter depending on implementation, i.e. the number of different options supported, but the information element may comprise a higher number of bits. With respect to the cell selection validity, the eNode B may provide the NE with a list of neighbour cells to which the cell selection is allowed. The list may be unique for each cell and/or for each eNode B. The list may be broadcasted by the eNode B, or the eNode B may include the list in an additional field in the RRC Connection Release message. The UE may use the list in addition to or instead of the cell selection threshold to determine whether or not to select a given cell and whether or not to request the context transfer.

In general, the number of bits in each information element in Table 1 is selected according to the implementation and specifications of the telecommunication system. The RPC messages may be efficiently coded such that a range of each in element needs not be an integer power of 2.

Figure 4:
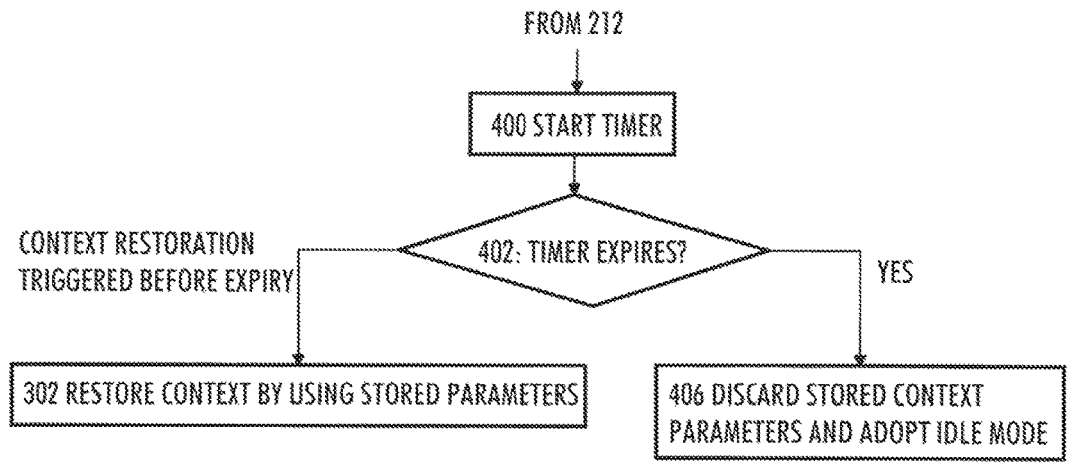

The release of the bearer service may be gradual and timer—based, as described above. FIG. 4 illustrates a flow diagram of the gradual release of the bearer service. The process may be carried out in the eNode P and/or in the UE. In response to step 206 or 212 of FIG. 2, a timer is started in step 400. With respect to the UE, the time counted by the timer may be determined from the command received from the eNode P in step 210. The timer used by the eNode may be the same used by the UE, or it may be longer to take into account the communication of the command in steps 208 and 210. In step 402, it is determined whether the timer has expired before the context restoration has been triggered. If the context restoration is triggered before the expiry of the timer, step 302 is carried out, i.e. the RRC connection is reestablished by using the stored context parameters. On the other hand, if the timer has expired without context restoration, the process proceeds to step 406 where the stored context parameters are discarded and where the UE adopts the idle mode. Using a timer in both the UE and the eNode B reduces signaling in the Uu interface, as no separate release commands are necessary.

In an alternative embodiment, the reduced connectivity in the radio interface is implemented by providing a new RRC state in addition to the RRC connected and RRC idle states. The new state may be called RRC Context state, for example, wherein the core network connection is maintained but the RRC connection is virtually released.

Figure 5:
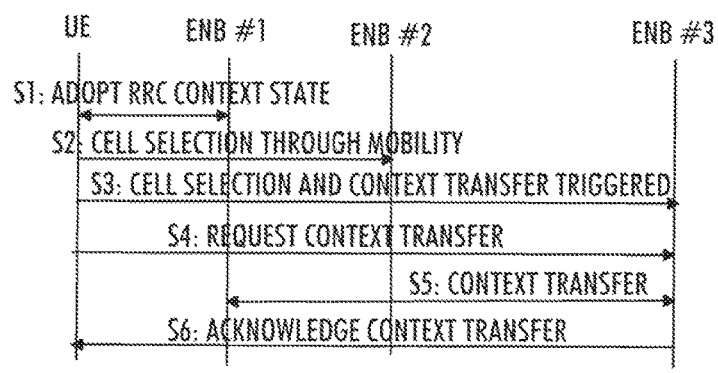
FIG. 5 is a signaling diagram illustrating transfer of context parameters of the bearer service with reduced radio connectivity according to an embodiment of the invention.

With respect to the context relocation mentioned above in relation to Table 1, the context relocation in the radio access network may depend on the number of cell (re) selections the UE has made in the reduced radio connectivity state, i.e. in the state where the UE has adopted at least some idle mode procedures (including cell selection) but is not yet in the idle state. FIG. 5 is a signaling diagram illustrating the context relocation as a result of the mobility of the UE in the reduced connectivity. Referring to FIG. 5, the UE and the currently serving eNode B (ENB#1 in FIG. 5) adopt the Delayed RRC Connection Release mode for reduced connectivity in step S1 in FIG. 5. The UE reads the cell selection threshold and monitors the number of cell selections made after the reception of the RRC Connection Release message of Table 1. In S2, the UE carries out idle state cell selection when having the reduced connectivity in S2, wherein the UE selects ENB#2 as the new cell where to camp, and increments a counter counting the number of cell selections. In order to exclude "ping pong" cell reselections from the counting, the UE may store a list of a number of previously selected cells, e.g. two, and exclude those cells from the counting in case they are reselected. The UE may also store the list of previously visited cells so as to avoid continuous reselection between two cells. In addition to reselection in idle state the UE may also consider previously visited cells due to handover during previous full RRC connectivity. In such a counting algorithm the UE may omit counting multiple intermediate cell selections when reselecting a previously selected or connected cell after a sequence of cell selections of other cells between the selection and the reselection of the cell. In other words, when the UE reselects a cell, a number corresponding to the cells selected between the selection and the reselection of the cell are reduced in the counting algorithm. In S3, the UE has made a determined number of cell selections defined by the cell selection threshold (in this embodiment, the value is exemplary two), and the UE sends to a currently selected eNode B (ENB#3) an RRC Context Relocation Request message in 34, thereby requesting the ENB#3 to retrieve the stored RRC context. The UE may include its unique identifier in the RRC Context Relocation Request message. The identifier may be an identifier that is locally unique over frequencies supported by the system. The identifier may include a cellular radio network temporary identifier (C-RNTI) previously assigned to the TIE and, optionally, a short. MAC identifier (Short-MAC-I). In another embodiment, the identifier may be a globally unique identifier, e.g. a cellular global identifier (CGI). In another embodiment, the identifier comprises a physical cell identifier (PCI) with a carrier index. When inter-frequency cell selection is allowed by the cell selection validity parameter and when the UE carries out the inter-frequency cell selection, a new ARC connection setup may be needed to communicate the RAC Context. Relocation Request message. In an embodiment, the inter-frequency cell selection automatically triggers the context relocation regardless of the counted number or cell selections. The UE may also provide an identifier of the eNode B that currently stores the context to facilitate the transfer of the context. The reception of the RRC Context Relocation Request message in the ENB#3 triggers the ENB#3 to communicate with the ENB#1 over the X2 interface in S5 so as to transfer the RRC context of the UE from the ENB#1 to the ENB#3. It is possible that there is no direct X2 connection between the ENB#1 and ENB#3 and, then, the RRC context may be relayed through one or more intermediate eNode Bs, e.g. ENB#2. Upon successful retrieval of the ARC context, the currently selected ENB#3 stores the RRC context, and it may also transmit to the UE an ARC Context Relocation Response message in S6 so that the UE may update the eNode A, that currently stores the context parameters. The RAC Context Relocation Response may be ciphered and integrity-protected, and it may be transmitted by using a common or dedicated signaling radio bearer (SRB0 or SRB1, respectively). The currently selected eNode B may also assign a new C-ANTI to the UE.

The UE may be configured to use contention-based random access in order to enable the above-mentioned context relocation procedure. In the context relocation procedure, the eNode B may be configured to reconfigure at least one of the following parameters of the RRC context: C-RNTI, dedicated physical resources and a security context, to update the stored. ARC context parameters accordingly, and to transmit an appropriate signaling message providing the reconfigurations to the UE. The UE may be configured to update the context parameters according to the received parameters but not to respond to such a message or, in general, to any received RRC Context Relocation Response message so as to avoid unnecessary signaling. The eNode B can verify the message reception, and thus the new C-RNTI allocation, based on Radio Link Control (RLC) Acknowledgement.

In an embodiment, the eNode B sends both the optional reconfiguration information and context relocation information as combined into the same message of the random access procedure, thereby reducing the number of signaling messages. The physical resource configuration for this message is still default for the cell, and applied keys for ciphering and integrity protection are derived based on the security context from the previous cell. An indication of at least some of the keys to be applied may also be included in the same message. The reconfiguration message may be transmitted as ciphered and/or as integrity protected before the contention is resolved within said random access procedure. Accordingly, the message is transmitted under contention and may fail, for example due to a preamble collision with another UE accessing at the same time. Upon reception of no proper RRC Context Relocation Response message from the currently selected eNode B, the UE may be configured to repeat random access contention and to retry the context relocation request in order to receive the new C-RNTI. In general, the UE may be configured to carry out contention-based random access whenever it needs to transmit information (control or data) to the eNode B having the UE camping in its cell. In this case, at least the dedicated physical resources need to be reconfigured for the purpose of further communication in the selected cell. In another embodiment, the eNode B receiving the RRC Context Relocation Request message may first determine whether or not the context transfer is necessary, i.e. the decision about the transfer of the context is made by the radio access network and not necessarily only on the basis of the number of cell selections. The eNode B making the decision may determine the number of X2 legs between itself and the eNode B currently storing the context. If the context is stored in an eNode B only one X2 leg (or a number of X2 legs below a threshold) away from the eNode B making the decision, the eNode B receiving the request may decide not to transfer the context, and it transmits a RRC Context Relocation Rejected message to the UE. Upon reception of such a message, the UE may be configured to request the relocation of the context after every cell selection until the context is transferred, or the UE may be configured to reset the counter counting the cell selection, and carry out the new context transfer request when a sufficient number of new cell selections has been made.

In a further alternative embodiment context relocation is not supported but, instead, the RRC connection is immediately released if an UE has carried out cell reselection a number of times exceeding a threshold without communication of signaling or data between the radio access network and the UE. The UE may send a High Mobility Indication message, for example, so as to initiate synchronized state transition into the idle state in the radio access network and in the core network (EPC).

When counting the number of cell selections during the procedure for the delayed release of the bearer service in any embodiment, e.g. when determining context release and/or context relocation, the UE may exclude from the counting of the number of cell selections a reselection of a cell that has been previously selected during the procedure for the delayed release of the bearer service. In other words, a cell reselection does not increment the counter. On the other hand, the cell reselection may increment the counter once a determined number of cell selections of other cells have been made between the initial selection and the reselection of the cell.

The core network connection of the bearer service may be left intact, i.e. it may still be connected to the original eNode B so as to avoid unnecessary rerouting of the core network connection in case the bearer service is to be released (step 406). With respect to FIG. 5, ENB#1 may store an identifier of the ENB#3 so that it knows to which eNode B the context was transferred so that the context and the core network connection may be relinked quickly in the reestablishment.

With respect to the restoration of the bearer service and the RRC context (step 302), the restoration of the context may be initiated by the eNode B that has the core network (S1) connection of the bearer service upon detection of downlink data in the core network connection. The eNode B may then forward the downlink data to the eNode B that currently stores the UE context. The identifier of the eNode B storing the context may be stored in the eNode B having the core network connection of the bearer service, as described above. Upon reception of the downlink data, the eNode B storing the UE context may be configured to transmit a paging request to neighboring eNode Bs to which an X2 connection is provided so as to page the UE. The eNode Bs receiving the paging request may attempt paging the UE over the Uu interface and, optionally further spread the paging to other eNode Bs through respective X2 connections. Paging over two (or more) X2 legs may be used as a backup if the UE does not respond to the paging request transmitted by the eNode Bs within one X2 leg from the eNode B that stores the UE context. When the mobility of the UE has been determined to be low or non-existent, the eNode B storing the UE context may be configured to page the UE only in the Uu interface, i.e. paging over the X2 connections is used as the backup. A paging message transmitted to the Uu interface by any eNode B may comprise a CGI and a C-RNTI of the UE, and the paging may be carried out according to the paging DRX parameter provided to the UE.

In an optimum case, the bearer service of the UE is restored in the same cell that was previously configured for full service for the UE. Then, both the UE and the serving eNode B may apply conventional MAC recovery procedures. When the bearer service is restored in another cell, context retrieval over the X2 interface and reconfiguration of at least some context parameters may be necessary. A need for downlink signaling or data traffic may trigger either paging or a physical dedicated control channel (PDCCH) command, which initiates the restoration of the bearer service. The full RRC connection may be restored by random access procedure typically without any reconfiguration. In a generic case where the UE initiates the RRC connection restoration as response to a paging message or upon detection of a need to transmit uplink data over the bearer service, the UE may be configured to transmit to a currently selected cell a RRC Connection Resume Request message through random access contention. The RRC Connection Resume Request message may comprise the identifier(s) of the UE, and the identifier(s) may be the same as used in the RRC Context Relocation Request message. Upon reception of the RRC Connection Resume Request message from the UE, the eNode B initiates the RRC connection restoration by retrieving the context parameters of the bearer service and restoring the RRC connection by using at least some of the stored context parameters, preferably all the stored RRC context parameters are default for the reconfiguration. Upon retrieval of the context parameters, the eNode B may respond to the UE by transmitting a secured RRC Connection Reconfiguration Message. Similar alternative embodiments are applicable as described above with context relocation.

Figure 6:
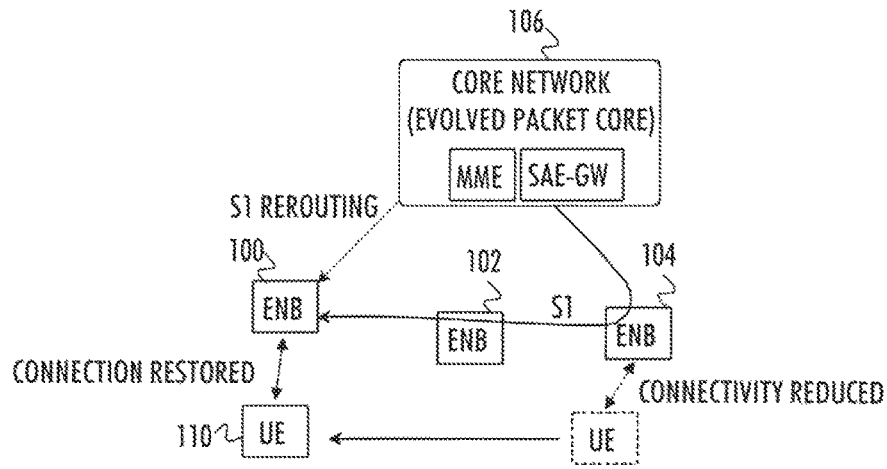
FIG. 6 illustrates rerouting of a core network connection of the bearer service according to an embodiment of the invention.

When the RRC connection is reestablished, the eNode B currently serving the UE or the eNode B currently having the core network connection of the bearer service may determine whether or not to reroute the core network connection to the eNode B currently serving the UE, or they may make the decision in cooperation. The amount of uplink and/or downlink data to be transferred and/or the number of X2 legs between the eNode Bs may be used as a basis for the decision. If only a small amount (below a given threshold) of data is to be transferred over the reestablished RRC connection and/or if the number of X2 legs is low, the current core network connection may be maintained. On the other hand, if the amount of data to be transferred is high (above the threshold) and/or if the number of X2 legs is high, the transfer of the core network connection may be carried out as illustrated in FIG. 6. Accordingly, the core network connection is routed from the core network directly to the eNode B restoring the RRC connection (through an S1 interface) instead of relaying the core network connection over X2 interfaces. The rerouting of the core network connection reduces the amount of data transferred over the X2 legs. On the other hand, maintaining the current core network connection and relaying the data over X2 connections reduces signaling between the core network and the radio access network and the UE. Additionally, there would be no need to reconfigure some of the parameters of the bearer service. In another embodiment, the rerouting of the core network connection is triggered by the context relocation, i.e. the core network connection is rerouted to the eNode B to which the context is transferred, or the rerouting of the core network connection is triggered upon a determined number of context relocations (higher than one). The rerouting of the core network (S1) connection may be carried out by using procedures similar to those disclosed in a co-pending PCT application having a filing number PCT/EP2010/062546.

Next, access stratum (AS) security key management is discussed in connection with the reduced connectivity state. When the UE needs to communicate in a new cell because of mobility and the cell selection in the reduced connectivity state, horizontal key derivation may be used to derive key(s) for the RRC context relocation request and RRC connection reconfiguration messages. An old next hop chaining counter (NCC, defines whether the next key is based on the current one or should the next hop be updated) may be used by default, but a new physical cell identifier and EARFCN-DL (Enhanced UMTS Terrestrial Radio Access Network Absolute Radio Frequency Channel Number for downlink) may be applied when the UE has selected a new cell in the reduced connectivity state. When the core network connection is rerouted, the MME may be configured to provide a new pair of Next Hop key (NH) and NCC ({NH, NCC}) according to a vertical key derivation process, and the eNode B may include the new keys (NH, NCC) in the RRC connection reconfiguration message transmitted to the UE so that they may be used in deriving appropriate keys in the eNode B and in the UE. When the core network connection has not been rerouted and when the RRC connection is reestablished in the same eNode B that initiated the reduced connectivity state, all the keys used before the reduced connectivity may be restored. When rerouting of the core network connection is not used and when the context is transferred and reconfigured in a new eNode B, horizontal key derivation may be used to derive the necessary keys. In this manner, the number of messages is reduced, specially from MME point of view.

If the RRC connection reestablishment fails, the UE and/or the eNode B may be configured to carry out a conventional RRC connection setup procedure. Then, the stored context parameters may be discarded, as they are not valid anymore, and the core network connection (and S1 context of the bearer service) may also be released and a new one established. With respect to the paging determined by the eNode B on the basis of downlink data traffic, the MME may provide a System Architecture Evolution Temporary Mobile Subscriber Identifier (S-TMSI) to the radio access network through the core network connection, and the S-TMSI may be stored as part of the stored context parameters. Accordingly, the eNode B having access to the context parameters are able to initiate the paging without first communicating with the MME to obtain the S-TMSI. Accordingly, the paging process is simplified and the signaling over the S1 interface is reduced. In another embodiment, the eNode B triggering the paging may request the MME to carry out the paging, and the paging may be carried out in a conventional manner from there on. In such a case, the MME may be configured to be aware that the existing core network connection of the bearer service is associated with the paging (eNode B may transmit an identifier of the core network connection or the bearer service related to the paging) and to use the core network connection in the paging procedure. In yet another embodiment, both paging options are available for use, and the UE may be configured to listen to both types of paging, i.e. one triggered by the eNode B and another triggered by the MME. In an embodiment, the S-TMSI may be applied to calculating a paging occasion (PO) for both types of paging, as triggered either by the eNode B or MME. An advantage is that the UE needs to listen to only one PO sequence, while the eNode B may still use radio-based identifiers in the paging, without a need to update S-TMSI due to the intimacy of the subscriber.

Figure 7:
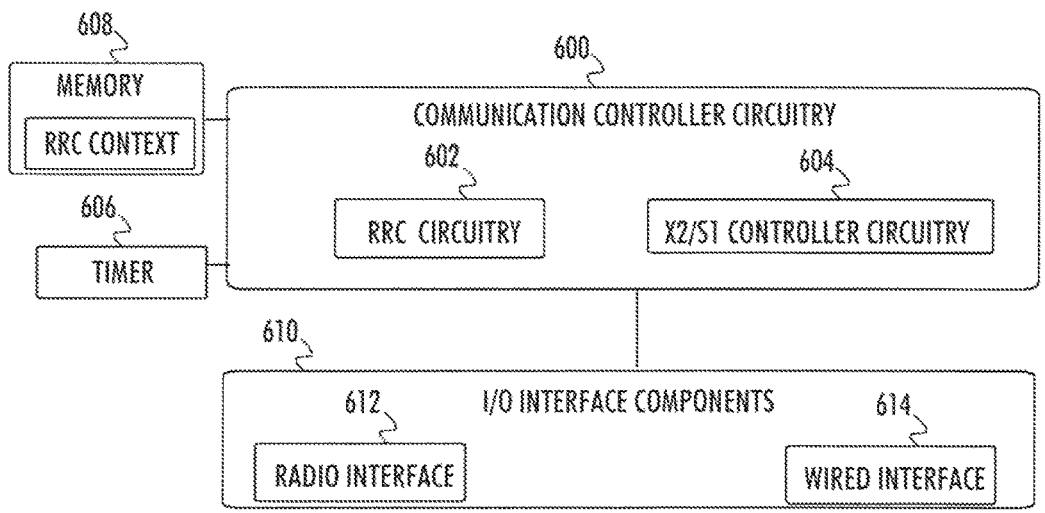
FIGS. 7 and 8 illustrate block diagrams of apparatuses according to embodiments of the invention.

FIG. 7 illustrates an embodiment of an apparatus for controlling a bearer service between the core network and the terminal device in the above-described manner. The apparatus may be the base station of a radio access network, e.g. the eNode B, or the apparatus may form part of the base station, and the apparatus may implement the above-described structures and functionalities of the eNode in connection with the reduced connectivity state of the bearer service. The apparatus comprises input/output (I/O) interface components 610 to establish the above-mentioned signaling connections with the core network, other base stations, and the UEs. The I/O interface components 610 may comprise radio interface components 612 configured to establish radio connections with the UEs, and wired interface components 614 configured to implement IP (Internet Protocol) and/or other types of connections towards the core network (S1 interface). The apparatus may use radio and/or wired interface components 612, 614 to implement the connections with other base stations (X2 interface). The radio interface components 612 may comprise standard well-known radio transceiver components such as amplifier, filter, frequency-converter, (de)modulator, and encoder/decoder circuitries and one or more antennas.

The apparatus may further comprise a memory 608 that stores computer programs configuring the apparatus to perform the above-described functionalities of the eNode B. The memory 608 may also store a database storing RRC context parameters for one or more bearer services associated with one or more UEs that have been communicating with the eNode B. The apparatus further comprises a timer 606 to count the time allowed for the reduced radio connectivity state before the bearer service is released.

The apparatus further comprises a communication controller circuitry 600 operationally connected to the memory 608 and the I/O interface components 610 to control the communication connections of the base station. The communication controller circuitry 600 may comprise a RRC circuitry 602 controlling the radio resources of the terminals devices served by the base station comprising the apparatus. The communication controller circuitry 600 may further comprise an X2/S1 interface controller circuitry 604 handling connections to the other base stations (X2) and to the core network (S1). The communication controller circuitry may establish the bearer service between a given terminal device and the core network by controlling the RRC circuitry to carry out RRC connection establishment and other RRC functionalities with the terminal device, and by communicating with the core network through the X2/S1 controller circuitry 604 so as to establish the core network connection of the bearer service. The communication controller circuitry may also monitor the bearer service and determine whether or not to reduce the radio connectivity, as described above. Upon determining to reduce the radio connectivity as a result of low data transfer activity in the bearer service, the communication controller circuitry 600 may configure the RRC circuitry to transmit the RRC Connection Release message of Table 1 to the terminal device and to store context parameters of the RRC connection in the memory 608. The communication controller circuitry 600 may, however, be configured to maintain the core network connection, i.e. it may control the X2/S1 controller circuitry 604 to maintain the core network connection. Upon RRC context transfer, the communication controller circuitry 600 may configure the X2/S1 controller circuitry 604 to negotiate with neighboring base stations so as to transfer the RRC context parameters from the memory 608. In case of rerouting the core network connection, the communication controller circuitry may configure the X2/S1 controller circuitry 604 to negotiate the release of the core network connection of the bearer service. The circuitries 602, 604 of the communication controller circuitry 600 may be carried out by the one or more physical circuitries or processors. In practice, the different circuitries may be realized by different computer program modules.

In an embodiment, the apparatus carrying out the embodiments of the invention in the base station comprises at least one processor 600, 602, 604 and at least one memory 608 including a computer program code, wherein the at least one memory and the computer program code are configured, with the at least one processor, to cause the apparatus to carry out the steps of the process of FIG. 2 that are carried out in the eNode B. In further embodiments, the at least one memory and the computer program code are configured, with the at least one processor, to cause the apparatus to carry out any one of the embodiments related to the reduced connectivity state in the base station, as described above in connection with FIGS. 2 to 6. Accordingly, the at least one processor, the memory, and the computer program code form processing means to carry out embodiments of the present invention in the base station.

Figure 8:
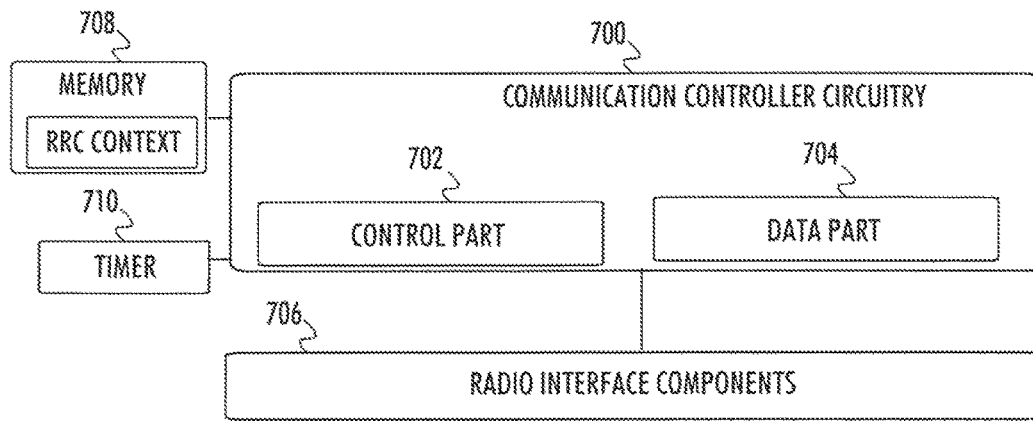

FIG. 8 illustrates an embodiment of an apparatus applicable to a terminal device. In an embodiment, the apparatus of FIG. 8 is the terminal device. The apparatus may comprise a communication controller circuitry 700 configured to control cellular radio connections in the terminal device. The communication controller circuitry 700 may comprise a control part 702 handling all the control signaling communication with the radio access network and the core network. The control part 702 communicates with the RRC circuitry 602 of the base station so as to control the radio connections of the bearer services. The communication controller circuitry 700 further comprises a data part 704 that handles transmission and reception of payload data. The control part 702 may be configured to process the RRC messages received from the base station and transmitted to the base station. The control part may also control the reduced RRC connectivity state for a given bearer service, as instructed by the serving base station. In the reduced radio connectivity state, the control part may monitor data in a buffer of the data part. If the buffer contains a sufficient amount of data of the bearer service that has the reduced radio connectivity state, the control part may trigger a random access procedure so as to request reestablishment of the radio connectivity for the bearer service. The control part may also control the cell selections according to an idle state cell selection procedure in the reduced radio connectivity state and count the number of cell selections that have been made. Upon a sufficient number of cell selections, the control part 702 may trigger the transmission of the RRC Context Relocation Request message, as described above. The circuitries 702, 704 of the communication controller circuitry 600 may be carried out by the one or more physical circuitries or processors. In practice, the different circuitries may be realized by different computer program modules.

The apparatus may further comprise a memory 708 that stores computer programs configuring the apparatus to perform the above-described functionalities of the terminal device. The memory 708 may also store communication parameters and other information needed for the cellular connections. The memory 708 may also store a database storing RRC context parameters for one or more bearer services that are operational or in reduced radio connectivity state, as described above. The apparatus further comprises a timer 710 to count the time allowed for the reduced radio connectivity state before the bearer service is released. The apparatus may further comprise radio interface components 706 providing the apparatus with radio communication capabilities with the radio access network. The radio interface components 706 may comprise standard well-known components such as amplifier, filter, frequency-converter, (de)modulator, and encoder/decoder circuitries and one or more antennas.

In an embodiment, the apparatus carrying out the embodiments of the invention in the terminal device comprises at least one processor 700, 702, 704 and at least one memory 708 including a computer program code, wherein the at least one memory and the computer program code are configured, with the at least one processor, to cause the apparatus to carry out the steps of the process of FIG. 2 that are carried out in the terminal device. In further embodiments, the at least one memory and the computer program code are configured, with the at least one processor, to cause the apparatus to carry out any one of the embodiments related to the reduced connectivity state in the terminal device, as described above in connection with FIGS. 2 to 6. Accordingly, the at least one processor, the memory, and the computer program code form processing means to carry out embodiments of the present invention in the terminal device.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory (ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in a server, cellular network device, or other network device.

The processes or methods described in FIGS. 2 to 6 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

An embodiment of the invention is a method comprising: providing, in a base station apparatus of a radio access network of a cellular telecommunication system, a bearer service between a terminal device and a core network through the base station, wherein the bearer service comprises a radio connection between the base station and the terminal device and a core network connection between the base station and the core network. The method further comprises determining that data transfer activity of the bearer service is low and, in response to the determination of low data transfer activity, storing context parameters of the radio connection, releasing radio resources of the radio connection while maintaining the core network connection, and initializing a procedure for delayed release of the whole bearer service. The procedure for the delayed release comprises: starting a timer in response to the release of the radio resources of the radio connection and, in response to expiry of the timer, releasing the radio connection and the core network connection.

In an embodiment, the release in response to the expiry of the timer is carried out without any control signaling with the terminal device.

An embodiment of the invention is a method comprising: providing, in a base station apparatus of a radio access network of a cellular telecommunication system, a bearer service between a terminal device and a core network through the base station, wherein the bearer service comprises a radio connection between the base station and the terminal device and a core network connection between the base station and the core network. The method further comprises: determining that data transfer activity of the bearer service is low and, in response to the determination of low data transfer activity, storing context parameters of the radio connection, releasing radio resources of the radio connection while maintaining the core network connection, and initializing a procedure for delayed release of the whole bearer service. The procedure for the delayed release comprises: utilizing at least some of the same mobility procedures as in an idle state for the terminal device associated with said bearer service, and transferring the stored context parameters to another base station according to the mobility of the terminal device in terms of relative distance with respect to the cell during the procedure for delayed release of the whole bearer service.

In an embodiment, the method(s) further comprise upon detection of increased data transfer activity in the bearer service, restoring the radio connection by using the stored context parameters of the radio connection. In response to the restoration of the radio connection, the embodiment may further comprise determining whether or not to reroute the core network connection on the basis of at least one of: mobility of the terminal device, and a degree of the detected data transfer activity, and rerouting the core network connection upon determining high data transfer activity and/or high mobility of the terminal device after the radio resources of the radio connection were released.

In an embodiment, the method further comprises receiving context parameters of another terminal device during said procedure for the delayed release of the bearer service of said other terminal device and, in connection with the transfer of the context parameters bearer service, reconfiguring at least some of the context parameters and causing transmission of at least some of the reconfigured context parameters to said other terminal device associated with the transferred context parameters in a single reconfiguration message. The transfer of the context parameters may be triggered through a random access procedure between said base station and said other terminal device, and the reconfiguration message may be transmitted as ciphered and/or as integrity protected before a contention is resolved within said random access procedure. In an embodiment, the method further comprises during the procedure for the delayed release and upon detection of increased downlink data transfer activity in the bearer service: paging the terminal device in a cell controlled by said base station, and transmitting a paging request related to said terminal device at least to the other base station. In an embodiment, the base station receives from a mobility management entity of said core network a paging identifier of the terminal device and initiates a paging procedure without involving the mobility management entity in the paging procedure.

An embodiment provides a method comprising: providing, in a terminal device, a bearer service comprising a radio connection and a radio resource control connection with a serving base station of a radio access network of a cellular telecommunication system and a core network connection with a core network of the cellular telecommunication system. The method further comprises: receiving a command to reduce radio connectivity of the bearer service from the serving base station and, in response to the received command, storing context parameters of the radio connection in a memory, adopting at least some idle state procedures without releasing the whole bearer service, and initializing a procedure for delayed release of the whole bearer service. The procedure for the delayed release comprises: starting a timer in response to the release of the radio resources of the radio connection, and in response to expiry of the timer, releasing the whole bearer service and entering an idle state.

In an embodiment, the release of the bearer service in response to the reception of the command to release the radio resources is carried out without any control signaling with the base station.

An embodiment provides a method comprising: providing, in a terminal device, a bearer service comprising a radio connection and a radio resource control connection with a serving base station of a radio access network of a cellular telecommunication system and a core network connection with a core network of the cellular telecommunication system. The method further comprises receiving a command to reduce radio connectivity of the bearer service from the serving base station and, in response to the received command, storing context parameters of the radio connection in a memory, adopting at least some idle state procedures without releasing the whole bearer service, and initializing a procedure for delayed release of the whole bearer service. The procedure for the delayed release comprises: tracking, by the terminal device, mobility of the terminal device with respect to a cell where the terminal device previously was registered in the radio access network during the procedure for delayed release of the whole bearer service, and requesting transfer of the stored context parameters to another base station upon detecting sufficient mobility in terms of relative distance with respect to the cell where the terminal device previously was registered in the radio access network during the procedure for delayed release of the whole bearer service.

In an embodiment, the method further comprises restoring the radio connection by using the stored context parameters of the radio connection.

In an embodiment, the at least some idle state procedures comprise idle state cell selection.

In an embodiment, the method further comprises: after a determined number of cell selections caused by the mobility of the terminal device during the procedure for the delayed release of the bearer service, transmitting a context relocation message to the radio access network, thereby requesting transfer of the context parameters of the radio connection to the currently selected base station.

In an embodiment, the method further comprises: tracking the number of cell selections that the terminal device has made without communicating with the radio access network during the procedure for the delayed release of the bearer service and, in response to the determined number of cell selection without communication with the radio access network, releasing the whole bearer service.

When counting the number of said cell selections, an embodiment excludes from the counting of the number of cell selections at least one cell selection during the procedure for delayed release of the bearer service in response to reselection, during the procedure for the delayed release of the bearer service, of a cell that has been previously selected or connected to by the terminal device. In other words, the previous selection may be carried out during the procedure for the delayed release of the bearer service or before initiating the procedure, and the reselection is carried cut during the procedure for the delayed release of the bearer service.

An embodiment provides an apparatus comprising at least one processor and at least one memory including a computer program code, wherein the at least one memory and the computer program code are configured, with the at least one processor, to cause the apparatus to: cause a base station of a radio access network of a cellular telecommunication system to provide a bearer service between a terminal device and a core network through the base station, wherein the bearer service comprises a radio connection between the base station and the terminal device and a core network connection between the base station and the core network; determine that data transfer activity of the bearer service is low, and, in response to the determination of low data transfer activity, to store context parameters of the radio connection, cause the base station to release radio resources of the radio connection while maintaining the core network connection, and to initialize a procedure for delayed release of the whole bearer service, wherein the apparatus is in the procedure for the delayed release configured to start a timer in response to the release of the radio resources of the radio connection and, in response to expiry of the timer, to release the radio connection and the core network connection.

In an embodiment, the at least one memory and the computer program code are configured, with the at least one processor, to cause the apparatus to release the radio connection and the core network connection without any control signaling with the terminal device in response to the expiry of the timer.

An embodiment provides an apparatus comprising at least one processor and at least one memory including a computer program code, wherein the at least one memory and the computer program code are configured, with the at least one processor, to cause the apparatus to: cause a base station of a radio access network of a cellular telecommunication system to provide a bearer service between a terminal device and a core network through the base station, wherein the bearer service comprises a radio connection between the base station and the terminal device and a core network connection between the base station and the core network; determine that data transfer activity of the bearer service is low, and, in response to the determination of low data transfer activity, to store context parameters of the radio connection, cause the base station to release radio resources of the radio connection while maintaining the core network connection, and to initialize a procedure for delayed release of the whole bearer service, wherein the apparatus is in the procedure for the delayed release configured to utilize at least some of the same mobility procedures as in an idle state for the terminal device associated with said bearer service, and to transfer the stored context parameters to another base station according to the mobility of the terminal device in terms of relative distance with respect to the cell during the procedure for delayed release of the whole bearer service.

In an embodiment, the at least one memory and the computer program code are configured, with the at least one processor, to cause the apparatus to restore the radio connection by using the stored context parameters of the radio connection upon detection of increased data transfer activity in the bearer service. In an embodiment, the at least one memory and the computer program code are configured, with the at least one processor, to cause the apparatus to determine, in response to the restoration of the radio connection, whether or not to reroute the core network connection on the basis of at least one of: mobility of the terminal device and a degree of the detected data transfer activity, and to cause rerouting of the core network connection upon determining of high data transfer activity and/or high mobility of the terminal device after the radio resources of the radio connection were released.

In an embodiment, the at least one memory and the computer program code are configured, with the at least one processor, to cause the apparatus to: receive context parameters of another terminal device during said procedure for the delayed release of the bearer service of said other terminal device and, in connection with the transfer of the context parameters, reconfigure at least some of the context parameters and cause transmission of at least some of the reconfigured context parameters to said other terminal device associated with the transferred context parameters in a single reconfiguration message. Said transfer of the context parameters may be triggered through a random access procedure between said base station and said other terminal device, and the at least one memory and the computer program code are configured, with the at least one processor, to cause the apparatus to transmit the reconfiguration message as ciphered and/or as integrity protected before a contention is resolved within said random access procedure.

In an embodiment, during the procedure for the delayed release and upon detection of increased downlink data transfer activity in the bearer service, the at least one memory and the computer program code are configured, with the at least one processor, to cause the apparatus to: page the terminal device in a cell controlled by said base station; and cause transmission of a paging request related to said terminal device at least to the other base station.

In an embodiment, the at least one memory and the computer program code are configured, with the at least one processor, to cause the apparatus to receive from a mobility management entity of said core network a paging identifier of the terminal device; and initiate a paging procedure in the base station without involving the mobility management entity in the paging procedure.

An embodiment provides an apparatus comprising at least one processor and at least one memory including a computer program code, wherein the at least one memory and the computer program code are configured, with the at least one processor, to cause the apparatus to: cause a terminal device to provide a bearer service comprising radio connection and a radio resource control connection with a serving base station of a radio access network of a cellular telecommunication system and a core network connection with a core network of the cellular telecommunication system; receive a command to reduce radio connectivity of the bearer service from the serving base station; and in response to the received command, store context parameters of the radio connection in a memory, adopt at least some of idle state procedures without releasing the whole bearer service, and initialize a procedure for delayed release of the whole bearer service, wherein the apparatus is in the procedure for the delayed release configured to start a timer in response to the received command and, in response to expiry of the timer, to release the bearer service and to enter an idle state.

In an embodiment, the at least one memory and the computer program code are configured, with the at least one processor, to cause the apparatus to release, in response to the expiry of the timer, the bearer service without any control signaling with the base station.

An embodiment provides an apparatus comprising at least one processor; and at least one memory including a computer program code, wherein the at least one memory and the computer program code are configured, with the at least one processor, to cause the apparatus to: cause a terminal device to provide a bearer service comprising radio connection and a radio resource control connection with a serving base station of a radio access network of a cellular telecommunication system and a core network connection with a core network of the cellular telecommunication system; receive a command to reduce radio connectivity of the bearer service from the serving base station; and in response to the received command, store context parameters of the radio connection in a memory, adopt at least some of idle state procedures without releasing the whole bearer service, and initialize a procedure for delayed release of the whole bearer service, wherein the apparatus is in the procedure for the delayed release configured to: track mobility of the terminal device with respect to a cell where the terminal device previously was registered in the radio access network during the procedure for delayed release of the whole bearer service; and request transfer of the stored context parameters to another base station upon detecting sufficient mobility in terms of relative distance with respect to the cell where the terminal device previously was registered in the radio access network during the procedure for delayed release of the whole bearer service.

In an embodiment, the at least one memory and the computer program code are configured, with the at least one processor, to cause the apparatus to restore the radio connection by using the stored context parameters of the radio connection.

In an embodiment, the at least some idle state procedures comprise idle state cell selection.

In an embodiment, the at least one memory and the computer program code are configured, with the at least one processor, to cause the apparatus to transmit, after a determined number of cell selections caused by the mobility of the terminal device during the procedure for the delayed release of the bearer service, a context relocation message to the radio access network, thereby requesting transfer of the context parameters of the radio connection to the currently selected base station.

In an embodiment, the at least one memory and the computer program code are configured, with the at least one processor, to cause the apparatus to track the number of cell selections that the terminal device has made without communicating with the radio access network during the procedure for the delayed release of the bearer service and, in response to the determined number of cell selections without communication with the radio access network, to release the whole bearer service.

When counting the cell selections, the at least one memory and the computer program code are configured, with the at least one processor, to cause the apparatus to exclude from the counting of the number of cell selections at least one cell selection during the procedure for delayed release of the bearer service in response to reselection, during the procedure for the delayed release of the bearer service, of a cell that has been previously selected or connected to by the terminal device.

An embodiment provides an apparatus, comprising means for carrying out any one of the above-described methods, processes, or functionalities for reducing radio connectivity in the radio access network. An embodiment of such means is a processor (or a combination of processors) configured by one or more computer program modules.

An embodiment provides computer program product embodied on a distribution medium readable by a computer and comprising program instructions which, when loaded into an apparatus, execute any one of the above-described methods, processes, or functionalities for reducing radio connectivity in the radio access network.

The present invention is applicable to the cellular or mobile telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
providing, in a base station apparatus of a radio access network of a cellular telecommunication system, a bearer service between a terminal device and a core network through the base station, wherein the bearer service comprises a radio connection between the base station and the terminal device and a core network connection between the base station and the core network;
determining whether data transfer activity of the bearer service is low; and
when data transfer activity is low, storing context parameters of the radio connection, releasing radio resources of the radio connection while maintaining the core network connection, and initializing a procedure for delayed release of the whole bearer service, the procedure for the delayed release comprising:
reducing signaling in the radio connection for the terminal device associated with said bearer service so as to reduce signaling overhead in the radio connection and power consumption in the terminal; and
transferring the stored context parameters to another base station according to the mobility of the terminal device in terms of relative distance with respect to the cell during the procedure for delayed release of the whole bearer service; and
further comprising:
upon detection of increased data transfer activity in the bearer service, restoring the radio connection by using the stored context parameters of the radio connection;
in response to the restoration of the radio connection, determining whether to reroute the core network connection on the basis of at least one of: mobility of the terminal device, and a degree of the detected data transfer activity; and
rerouting the core network connection upon determining high data transfer activity and/or high mobility of the terminal device after the radio resources of the radio connection were released.

2. The method of claim 1, further comprising:
receiving context parameters of another terminal device during said procedure for the delayed release of the bearer service of said other terminal device; and
in connection with the transfer of the context parameters bearer service, reconfiguring at least some of the context parameters and causing transmission of at least some of the reconfigured context parameters to said other terminal device associated with the transferred context parameters in a single reconfiguration message.

3. The method of claim 2, wherein said transfer of the context parameters is triggered through a random access procedure between said base station and said other terminal device, and wherein the reconfiguration message is transmitted as ciphered and/or as integrity protected before a contention is resolved within said random access procedure.

4. The method of claim 1, further comprising, during the procedure for the delayed release and upon detection of increased downlink data transfer activity in the bearer service:
paging the terminal device in a cell controlled by said base station; and
transmitting a paging request related to said terminal device at least to the other base station.

5. The method of claim 1, further comprising:
receiving from a mobility management entity of said core network, a paging identifier of the terminal device; and
initiating a paging procedure in the base station without involving the mobility management entity in the paging procedure.

6. A computer program product comprising a non-transitory computer-readable storage medium bearing computer program code embodied therein for use with a computer, the computer program code comprising code for performing the method according to claim 1.

7. A method comprising:
providing, in a terminal device, a bearer service comprising a radio connection and a radio resource control connection with a serving base station of a radio access network of a cellular telecommunication system and a core network connection with a core network of the cellular telecommunication system;
receiving a command to reduce radio connectivity of the bearer service from the serving base station; and
in response to the received command, storing context parameters of the radio connection in a memory, reducing signaling in the radio connection without releasing the whole bearer service so as to reduce signaling overhead in the radio connection and power consumption in the terminal device, and initializing a procedure for delayed release of the whole bearer service, the procedure for the delayed release comprising:
tracking, by the terminal device, mobility of the terminal device with respect to a cell where the terminal device previously was registered in the radio access network during the procedure for delayed release of the whole bearer service; and
requesting transfer of the stored context parameters to another base station upon detecting mobility in terms of relative distance with respect to the cell where the terminal device previously was registered in the radio access network during the procedure for delayed release of the whole bearer service, and further comprising:

after a determined number of cell selections caused by the mobility of the terminal device during the procedure for the delayed release of the bearer service, transmitting a context relocation message to the radio access network, thereby requesting transfer of the context parameters of the radio connection to the currently selected base station;

tracking the number of cell selections that the terminal device has made without communicating with the radio access network during the procedure for the delayed release of the bearer service; and in response to the determined number of cell selection without communication with the radio access network, releasing the whole bearer service.

8. The method of claim 7, further comprising:

restoring the radio connection by using the stored context parameters of the radio connection.

9. The method of claim 7, further comprising:

when counting the number of said cell selections, excluding from the counting of the number of cell selections at least one cell selection during the procedure for delayed release of the bearer service in response to reselection, during the procedure for the delayed release of the bearer service, of a cell that has been previously selected or connected to by the terminal device.

10. A computer program product comprising a non-transitory computer-readable storage medium bearing computer program code embodied therein for use with a computer, the computer program code comprising code for performing the method according to claim 7.

11. An apparatus comprising:

at least one processor; and at least one memory including a computer program code, wherein the at least one memory and the computer program code are configured, with the at least one processor, to cause the apparatus to:

provide a bearer service between a terminal device and a core network through the apparatus, wherein the bearer service comprises a radio connection between the apparatus and the terminal device and a core network connection between the apparatus and the core network;

determine whether data transfer activity of the bearer service is low; and when data transfer activity is low, store context parameters of the radio connection, cause the apparatus to release radio resources of the radio connection while maintaining the core network connection, and initialize a procedure for delayed release of the whole bearer service, wherein the apparatus in the procedure for the delayed release is configured to reduce signaling in the radio connection for the terminal device associated with said bearer service so as to reduce signaling overhead in the radio connection and power consumption in the terminal device, and to transfer the stored context parameters to another base station according to the mobility of the terminal device in terms of relative distance with respect to the cell during the procedure for delayed release of the whole bearer service, and wherein the at least one memory and the computer program code are further configured, with the at least one processor, to cause the apparatus to restore the radio connection by using the stored context parameters of the radio connection upon detection of increased data transfer activity in the bearer service; to cause the apparatus to determine, in response to the restoration of the radio connection, whether to reroute the core network connection on the basis of at least one of: mobility of the terminal device and a degree of the detected data transfer activity; and to cause rerouting of the core network connection upon determining of high data transfer activity and/or high mobility of the terminal device after the radio resources of the radio connection were released.

12. The apparatus of claim 11, wherein the at least one memory and the computer program code are further configured, with the at least one processor, to cause the apparatus to:

receive context parameters of another terminal device during said procedure for the delayed release of the bearer service of said other terminal device; and in connection with the transfer of the context parameters, reconfigure at least some of the context parameters and cause transmission of at least some of the reconfigured context parameters to said other terminal device associated with the transferred context parameters in a single reconfiguration message.

13. The apparatus of claim 12, wherein said transfer of the context parameters is triggered through a random access procedure between said base station and said other terminal device, and wherein the at least one memory and the computer program code are further configured, with the at least one processor, to cause the apparatus to transmit the reconfiguration message as ciphered and/or as integrity protected before a contention is resolved within said random access procedure.

14. The apparatus of claim 11, wherein, during the procedure for the delayed release and upon detection of increased downlink data transfer activity in the bearer service, the at least, one memory and the computer program code are further configured, with the at least one processor, to cause the apparatus to:

page the terminal device in a cell controlled by said base station; and cause transmission of a paging request related to said terminal device at least to the other base station.

15. The apparatus of claim 11, wherein the at least one memory and the computer program code are further configured, with the at least one processor, to cause the apparatus to:

receive from a mobility management entity of said core network, a paging identifier of the terminal device; and initiate a paging procedure in the base station without involving the mobility management entity in the paging procedure.

16. The apparatus of claim 11, wherein the apparatus comprises said base station.

17. An apparatus comprising:

at least one processor; and at least one memory including a computer program code, wherein the at least one memory and the computer program code are configured, with the at least one processor, to cause the apparatus to:

cause the apparatus to provide a bearer service comprising radio connection and a radio resource control connection with a serving base station of a radio access network of a cellular telecommunication system and a core network connection with a core network of the cellular telecommunication system;

receive a command to reduce radio connectivity of the bearer service from the serving base station; and in response to the received command, store context parameters of the radio connection in a memory, reduce signaling in the radio connection without releasing the whole bearer service so as to reduce signaling overhead in the radio connection and power consumption in the apparatus, and initialize a procedure for delayed release of the whole bearer service, wherein the apparatus in the procedure for the delayed release is configured to:

track mobility of the apparatus with respect to a cell where the terminal device previously was registered in the radio access network during the procedure for delayed release of the whole bearer service; and request transfer of the stored context parameters to another base station upon detecting mobility in terms of relative distance with respect to the cell where the terminal device previously was registered in the radio access network during the procedure for delayed release of the whole bearer service, and wherein the at least one memory and the computer program code are further configured, with the at least one processor, after a determined number of cell selections caused by the mobility of the apparatus during the procedure for the delayed release of the bearer service, to transmit a context relocation message to the radio access network, thereby requesting transfer of the context parameters of the radio connection to the currently selected base station; to track the number of cell selections that the apparatus has made without communicating with the radio access network during the procedure for the delayed release of the bearer service; and, in response to the determined number of cell selection without communication with the radio access network, to release the whole bearer service.

18. The apparatus of claim 17, wherein the at least one memory and the computer program code are further configured, with the at least one processor, to cause the apparatus to restore the radio connection by using the stored context parameters of the radio connection.

* * * * *